United States Patent
Chellew

(10) Patent No.: US 9,293,747 B2
(45) Date of Patent: Mar. 22, 2016

(54) MULTI CELL CARRIERS

(75) Inventor: Justin Terrance Chellew, Lebanon, NJ (US)

(73) Assignee: Ingersoll-Rand Company, Davidson, NC (US)

( * ) Notice: Subject to any disclaimer, the term of this patent is extended or adjusted under 35 U.S.C. 154(b) by 133 days.

(21) Appl. No.: 14/235,646

(22) PCT Filed: Aug. 1, 2011

(86) PCT No.: PCT/US2011/046073
§ 371 (c)(1),
(2), (4) Date: Jan. 28, 2014

(87) PCT Pub. No.: WO2013/019203
PCT Pub. Date: Feb. 7, 2013

(65) Prior Publication Data
US 2014/0154532 A1    Jun. 5, 2014

(51) Int. Cl.
| H01M 2/10 | (2006.01) |
|---|---|
| B25F 5/00 | (2006.01) |
| B25F 5/02 | (2006.01) |
| H01M 10/42 | (2006.01) |

(52) U.S. Cl.
CPC ............... *H01M 2/105* (2013.01); *B25F 5/006* (2013.01); *B25F 5/02* (2013.01); *H01M 2/1055* (2013.01); *H01M 10/4257* (2013.01); *H01M 2200/30* (2013.01)

(58) Field of Classification Search
CPC ... H01M 2/105; H01M 2/1055; H01M 2200/30
See application file for complete search history.

(56) References Cited

U.S. PATENT DOCUMENTS

| 1,673,403 | A | 6/1928 | Dam |
|---|---|---|---|
| 5,945,235 | A | 8/1999 | Clanton et al. |
| 6,109,530 | A | 8/2000 | Larson et al. |
| 6,313,397 | B1 | 11/2001 | Washio et al. |
| 6,333,091 | B1 | 12/2001 | Kasugai et al. |
| 7,189,473 | B2 | 3/2007 | Smith et al. |
| 7,550,228 | B2 * | 6/2009 | Izawa ........................... 429/160 |
| 8,124,275 | B2 | 2/2012 | Washima et al. |
| 8,309,248 | B2 | 11/2012 | Koetting et al. |
| 2002/0007552 | A1 | 1/2002 | Singleton et al. |
| 2005/0058890 | A1 | 3/2005 | Brazell et al. |
| 2006/0159984 | A1 | 7/2006 | Nagayama et al. |
| 2007/0122692 | A1 | 5/2007 | Smith et al. |

(Continued)

FOREIGN PATENT DOCUMENTS

| CN | 1658408 A | 8/2005 |
|---|---|---|
| CN | 102054947 A | 5/2011 |

(Continued)

OTHER PUBLICATIONS

International Search Report for corresponding PCT Application No. PCT/US2011/046073, Date of mailing Mar. 9, 2012.

(Continued)

*Primary Examiner* — Stewart Fraser
(74) *Attorney, Agent, or Firm* — Sunstone IP

(57) ABSTRACT

Battery cell carriers that have a semi-rigid elastomeric cell carrier body with a plurality of closely spaced apart, substantially parallel and substantially cylindrical channels. Each channel has a length, with neighboring channels sharing a sidewall therebetween. The channels are configured to hold at least a major portion of a length of a respective battery cell.

19 Claims, 13 Drawing Sheets

(56) References Cited

U.S. PATENT DOCUMENTS

| | | | |
|---|---|---|---|
| 2007/0173090 A1* | 7/2007 | Johnson et al. | 439/157 |
| 2007/0264562 A1 | 11/2007 | Kang et al. | |
| 2008/0003491 A1 | 1/2008 | Yahnker et al. | |
| 2008/0003495 A1 | 1/2008 | Shimizu | |
| 2008/0254356 A1 | 10/2008 | Liersch et al. | |
| 2010/0156350 A1 | 6/2010 | Murayama et al. | |
| 2011/0097619 A1 | 4/2011 | Park | |
| 2011/0111278 A1 | 5/2011 | Ghosh et al. | |
| 2011/0151304 A1 | 6/2011 | Joswig et al. | |

FOREIGN PATENT DOCUMENTS

| | | | |
|---|---|---|---|
| DE | 102008059972 A1 | 6/2010 | |
| JP | 2006-196277 A | 7/2006 | |
| JP | 2008-010315 | 1/2008 | |
| KR | 2006-0083127 A | 7/2006 | |

OTHER PUBLICATIONS

Photos of existing product examples, date unknown but believed to be prior to the priority date of the current application, 7 pages.

International Preliminary Report on Patentability dated Feb. 4, 2014 from International Patent Application No. PCT/US2011/046073, filed Aug. 8, 2011.

European Search Report dated Mar. 24, 2015 from European Patent Application No. 11870377.6, filed Aug. 1, 2011.

Office Action dated Sep. 18, 2015 from Chinese Patent Application No. 201180073918.3, filed Aug. 1, 2011.

* cited by examiner

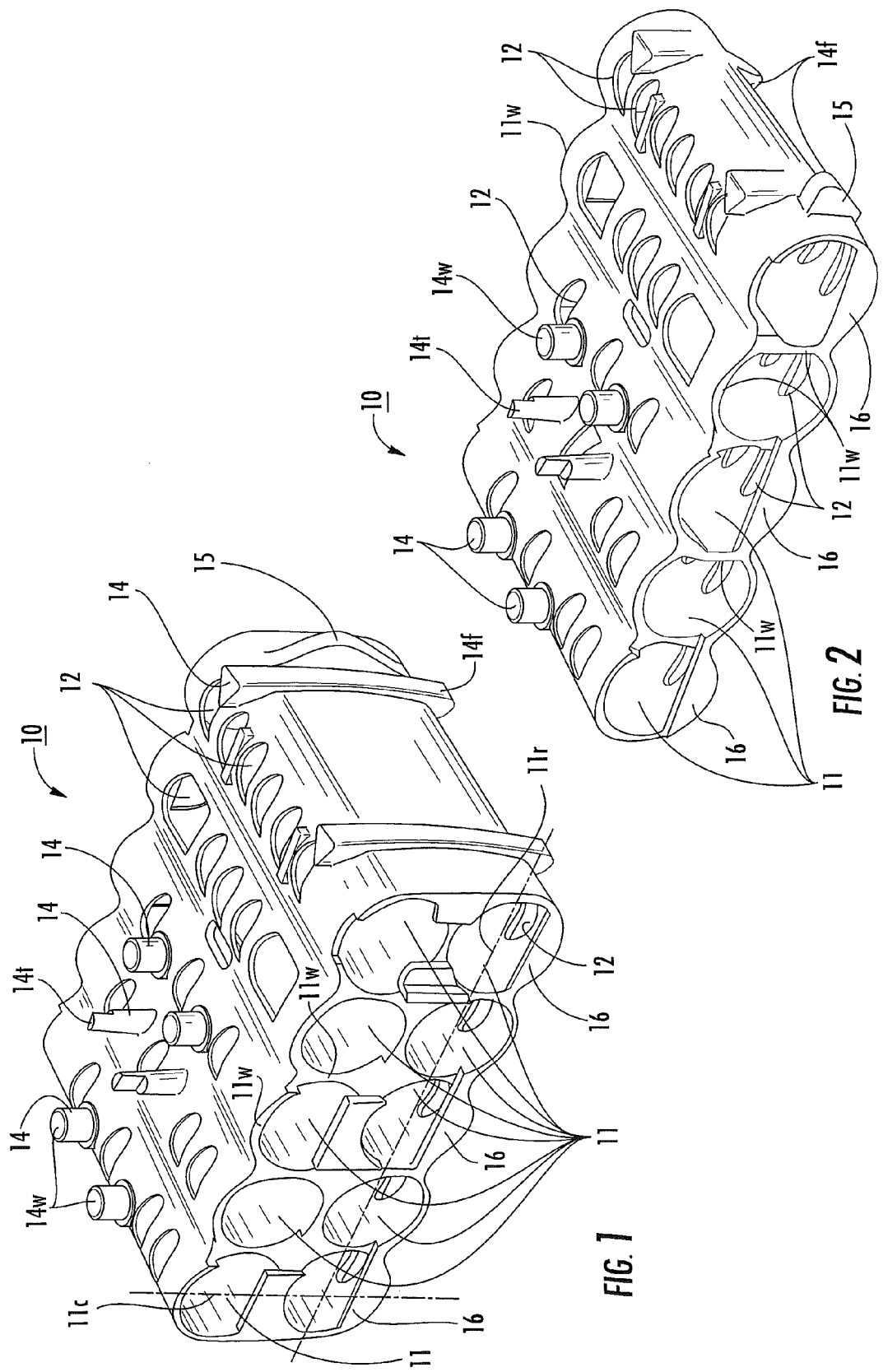

MULTI CELL CARRIERS

RELATED APPLICATION

This application is a 35 USC §371 national phase application of PCT/US2011/046073, filed Aug. 1, 2011, the contents of which are hereby incorporated by reference as if recited in full herein.

FIELD OF THE INVENTION

This invention relates to electric devices with releasable battery packs.

BACKGROUND OF THE INVENTION

Various electric devices, including cordless electric power tools, are well-known. Examples of such tools include, but are not limited to, drills, drill drivers, impact wrenches, grease guns and the like. Such devices can use releasable, typically rechargeable, battery packs.

SUMMARY OF EMBODIMENTS OF THE INVENTION

Embodiments of the invention are directed to multi-cell carriers that hold and align cells for battery packs. The cell carriers may be particularly suitable for battery packs for cordless power tools.

The multi-cell carriers can both hold the cells in alignment that allow for ease of electrical connection(s), as well as provide integral, impact-resistance, cushion and/or shock absorbance, which can help protect the cells before and/or when positioned inside a battery pack housing.

The multi-cell carriers can be formed as a single (unitary), monolithic body.

The multi-cell carriers can have a multi-piece body, with first and second pieces that are configured to cooperate to hold different longitudinal segments of respective cells.

The multi-cell carriers can be stackable.

A plurality of multi-cell carriers can interlockingly engage to hold cells.

Some embodiments are directed to multi-cell carriers for battery cells. The carriers include a semi-rigid elastomeric carrier having a plurality of closely spaced apart, substantially parallel and substantially cylindrical channels. Each channel has an outer wall and a length, with neighboring channels sharing a sidewall therebetween. At least some of the channels include at least one vent extending though the outerwall. The channels are sized and configured to hold at least a major portion of a length of a respective battery cell.

The channels can be arranged as an array of channels with at least two vertically aligned rows of channels.

The elastomeric carrier can have a carrier body with a Shore A hardness of between about 60-90.

At least some of the channels can have a plurality of vents in the respective outerwall spaced apart along their length.

The carriers can include at least one upwardly extending member that extends above a channel outer wall that provides for impact resistance and/or alignment when assembled to a housing of a battery pack.

The carrier can have a carrier body with an upper surface and a lower surface. The channel outerwalls associated with the upper surface have a different vent configuration than the channel outerwalls associated with the lower surface.

The carriers can include at least one outwardly extending bumper.

The at least one bumper can extend outwardly from an end of the carrier in a direction that is substantially orthogonal to an axially extending centerline of the channels.

At least one of the channels can include a retention member at an end thereof.

The carrier may include downwardly extending feet that project a distance outside bounds of a lower primary surface of the carrier.

The carrier can have body of a first substrate and at least one overmold portion on the first substrate that has a softer material (lesser Shore A hardness) than the first substrate.

The cell carrier can include an array of channels includes two overlying rows of five channels each.

The carrier can include a plurality of cooperating elastomeric carrier bodies, including a first elastomeric carrier body and a second elastomeric carrier body, each having plurality of cell channels that hold cells for a battery.

The first and second carrier bodies can have aligned, longitudinally spaced apart channel portions that cooperate to hold more than a major portion of the length of a respective battery cell.

The first and second bodies can be configured to attach to each other.

The cell carrier can be configured as a single monolithic molded elastomeric body.

Some embodiments are directed to battery packs for an electric device in combination with any of the cell carriers of Claims 1-16. The battery packs can also include a plurality of substantially cylindrical battery cells, one each residing in a respective channel. At least a major portion of a length of a respective battery cell is held by a respective channel. The battery packs also include a battery pack housing holding the carrier with the cells.

The battery pack housing can be sized and configured to releasably engage a cordless power tool.

The battery pack can include a circuit board residing over the carrier with the cells. Upwardly projecting members from the carrier can extend (through and) above the circuit board.

Yet other embodiments are directed to cordless power tools. The tools include: a power tool housing; and a battery pack that releasably engages the power tool housing. The battery pack includes: (i) a semi-rigid elastomeric cell carrier having a plurality of closely spaced apart, substantially parallel and substantially cylindrical channels, wherein each channel has an outer wall and a length, with neighboring channels sharing a sidewall therebetween; and (ii) a plurality of substantially cylindrical battery cells, one each residing in a respective channel, wherein at least a major portion of a length of a respective battery cell is held by a respective channel.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 1 is a side perspective view of an exemplary cell carrier according to embodiments of the present invention.

FIG. 2 is a side perspective view on another exemplary cell carrier according to embodiments of the present invention.

DESCRIPTION OF EMBODIMENTS OF THE INVENTION

Figure 3A:
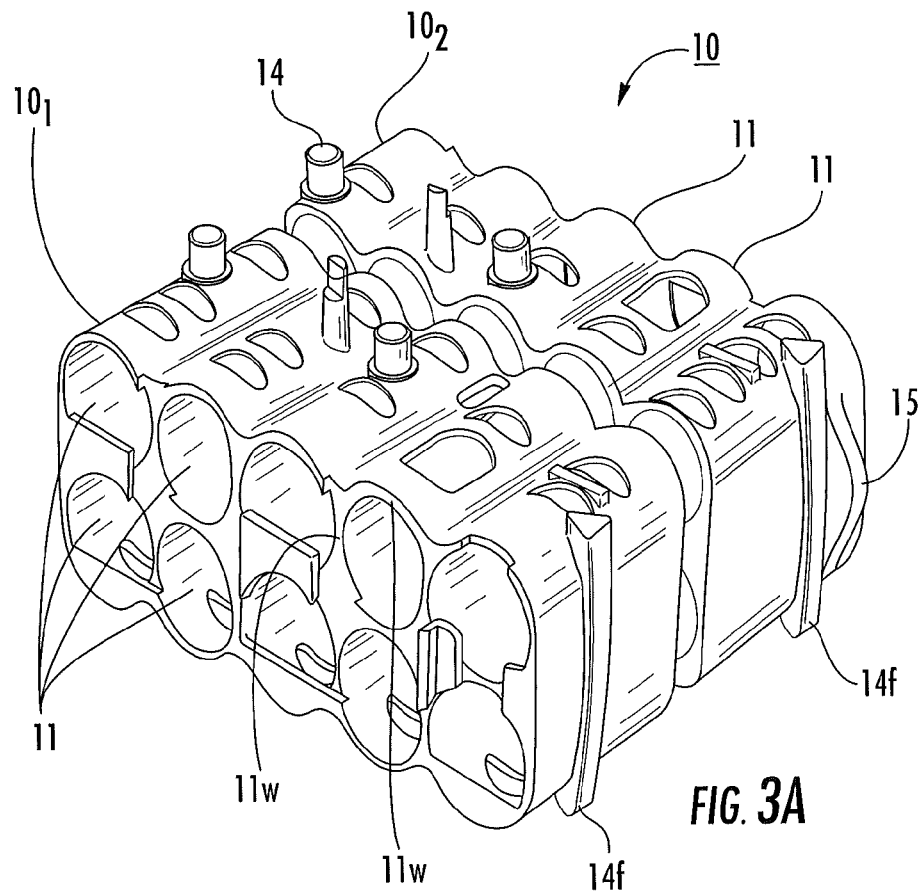
FIG. 3A is a side perspective view of yet another cell carrier embodiment according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" power tool refers to power tools that do not require plug-in, hard-wired ("corded") electrical connections to an external power source to operate. Rather, the cordless power tools have electric motors that are powered by on-board batteries, such as rechargeable batteries. A range of batteries may fit a range of cordless tools. In some embodiments, a "universal" battery pack can operate a number of different power tools. Different cordless power tools may have a variety of electrical current demand profiles that operate more efficiently with batteries providing a suitable range of voltages and current capacities. The different cordless (e.g., battery powered) power tools can include, for example, screwdrivers, ratchets, nutrunners, impacts, drills, drill drivers, grease guns and the like. The cordless power tools can have a linear body, a pistol body or an angled forward end. The cordless power tools can releasably engage a battery pack as is known by those of skill in the art. The battery of the battery pack can include a plurality of battery cells, typically cylindrical cells.

As used herein, "monolithic" means an object that is a single, unitary molded piece formed of a common material.

Figure 4:
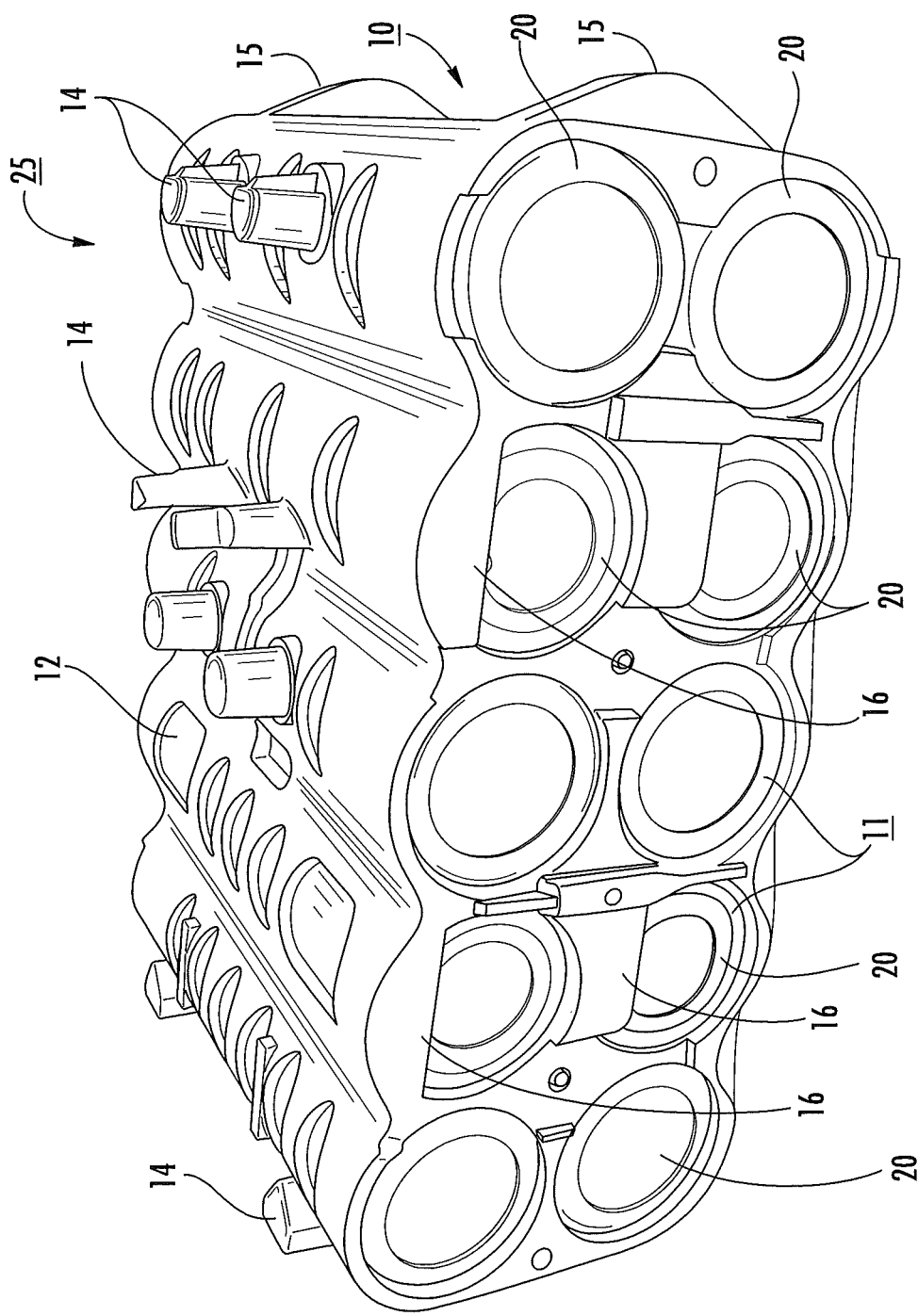
FIG. 4 is a top, end perspective view of a cell carrier with cells loaded according to embodiments of the present invention.

FIG. 1 illustrates an example of a multi-cell carrier 10 according to embodiments of the present invention. As shown, the carrier 10 includes a plurality of substantially cylindrical channels 11 that are sized and configured to receive, and snugly hold, at least a major portion of a length of a respective battery cell 20 (FIG. 4). As shown, the carrier 10 has an array of elongate channels 11, aligned in rows 11r and columns 11c. In the embodiment shown in FIG. 1, there are two columns and two rows, with two channels 11 in each column 11c and five channels 11 in each row 11r for a total of ten cell channels 11. Although shown with centerlines of each channel 11 being aligned in each row and column, other alignment configurations may be used.

It is also contemplated that the carrier 10 can include a first set of channels 11 that are substantially parallel and extend in one direction and another set of channels 11 that are substantially parallel and extend orthogonal to the first set of channels (not shown).

Figure 5:
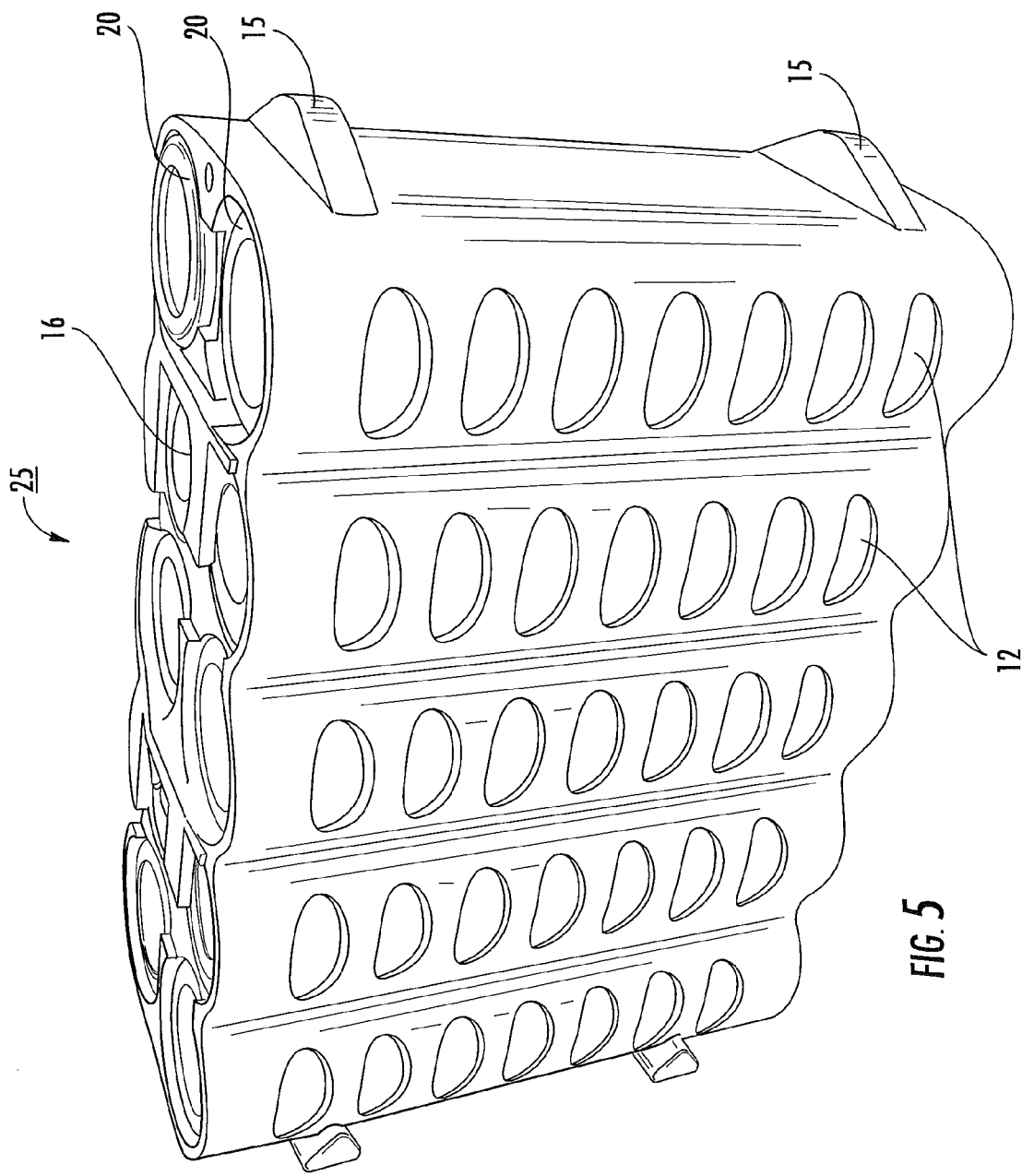
FIG. 5 is a bottom perspective view of the cell carrier loaded with cells shown in FIG. 4 according to embodiments of the present invention.

The carrier 10 can include outwardly (shown as upwardly in the orientation shown) extending members 14 and vents 12. As shown in FIG. 1, upper surfaces of respective different cell channels 11 can have different vent configurations. In some embodiments, the lower surfaces of respective channels 11 can have the same vent configurations as shown in FIG. 5 and can be different from the corresponding cell channel upper surface vents 12.

The carrier 10 can include outwardly extending feet 14f that extends a short distance beyond bounds of the primary carrier body. In some embodiments, the lower surface can be planar or have shaped contours. In other embodiments, the lower surface may not use feet 14f.

The carrier 10 can include surfaces with bumpers 15 that extend outwardly, typically substantially orthogonal to an axially extending centerline of the channels 11.

FIG. 2 illustrates that the carrier 10 can include a single row 11r of aligned channels 11 with five such channels. However, the single row can include two, three, four or six or more such channels 11.

Figure 9A:
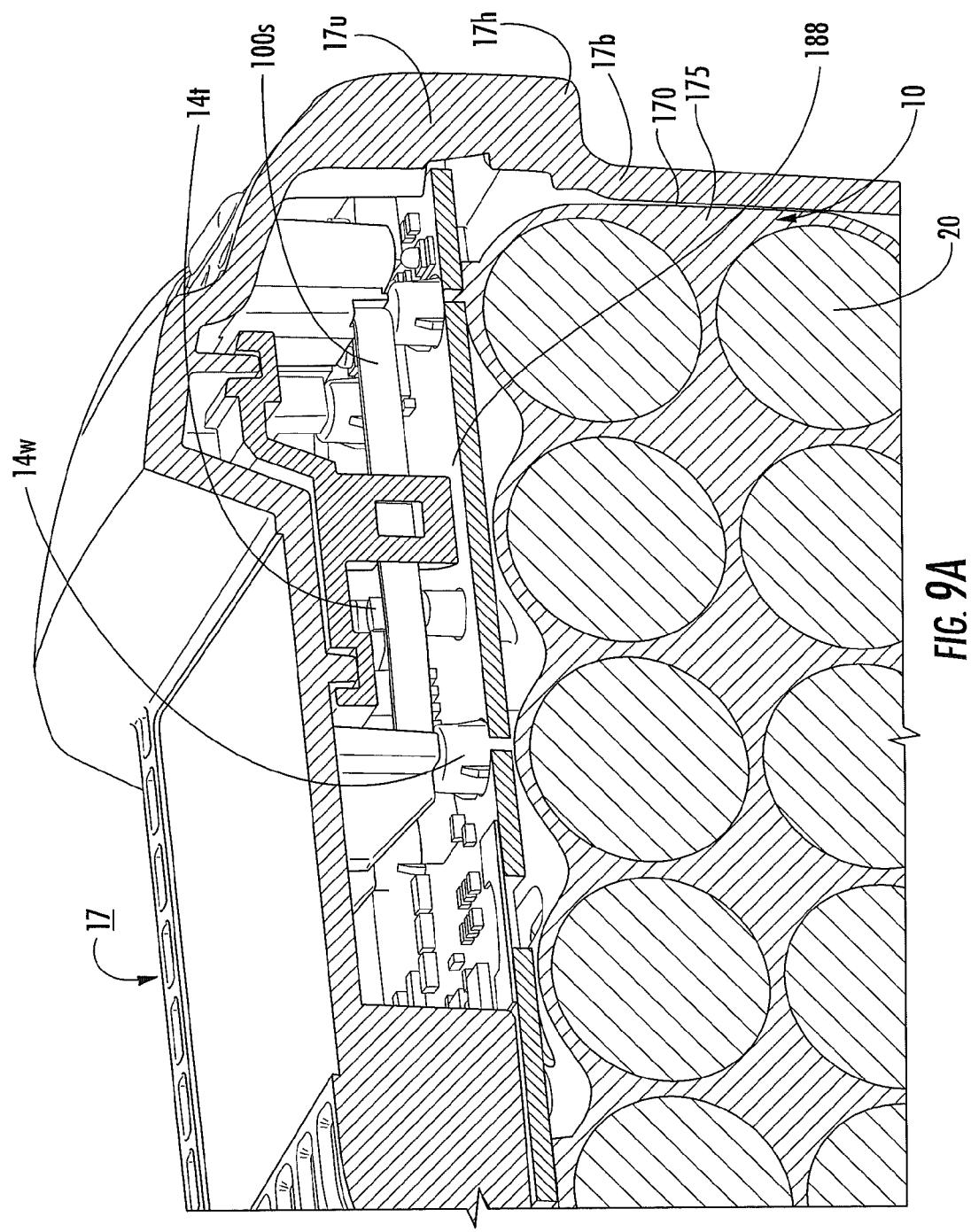
FIG. 9A is an enlarged, partial section view of a cell carrier with cells in a battery pack according to embodiments of the present invention.
Figure 9B:
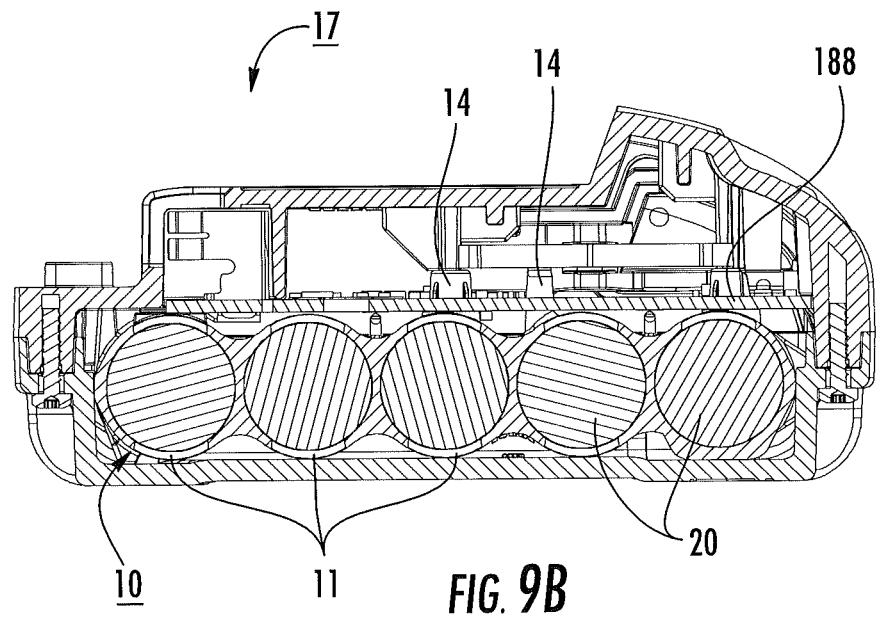
FIGS. 9B and 9C are side section views of an assembled battery pack with cell carriers and battery cells according to embodiments of the present invention.
Figure 9C:
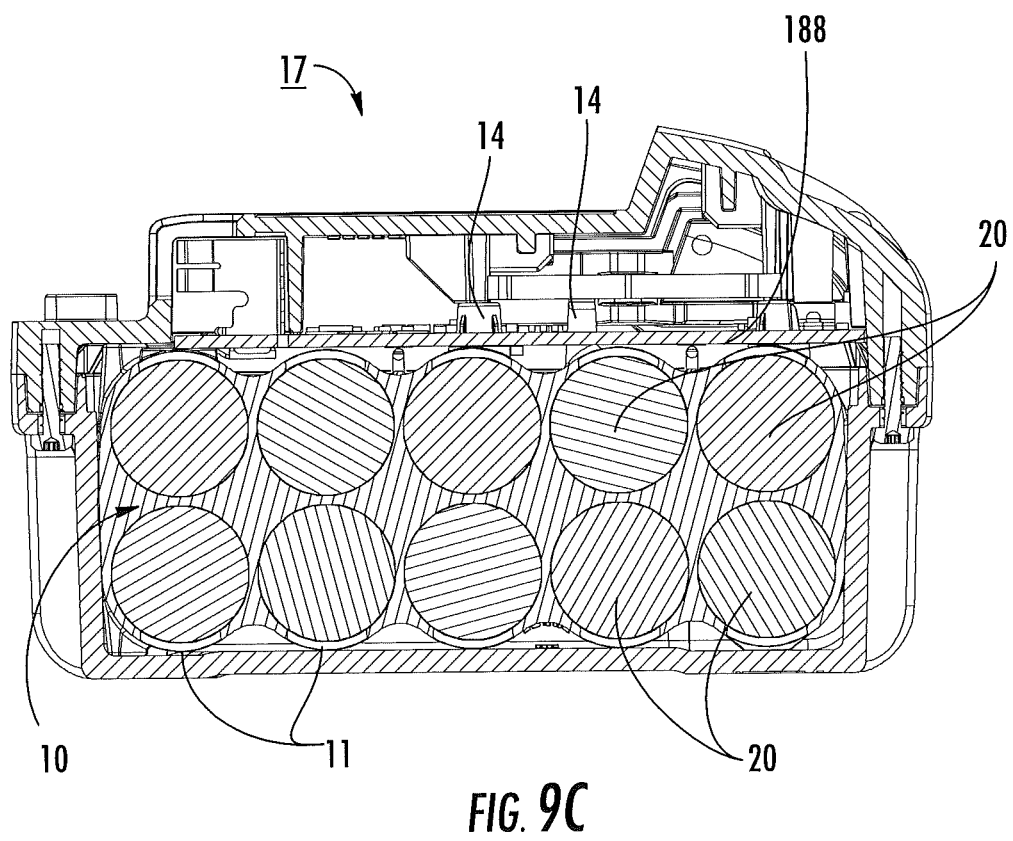

The carriers 10, such as the exemplary carriers shown in FIGS. 1 and 2, can define a carrier body that can arrange and hold battery cells 20 so that they can be easily electrically connected together. The carrier 10 and cells 20 can then be easily assembled inside a battery pack housing 17 as shown in FIGS. 9A-9C. In addition, the carrier 10 can protect the cells 20 from damage that can be caused by impact after installation into the battery housing 17. In some embodiments, the overall size of a battery pack can be reduced by a compact carrier that can hold cells relatively close together.

The carrier 10 can have a semi-rigid elastomeric body. The term "semi-rigid" means that the carrier 10 can be configured with sufficient hardness or durometer for stiffness and/or structural rigidity suitable to aid in holding the cells in proper alignment/arrangement while also having sufficient softness and/or elasticity to be able to provide cushioning to protect/inhibit cells from impact damage.

FIGS. 1 and 2 illustrate that some channels 11 can include cell retention members 16, e.g., tabs, fingers or planar surfaces or other features on at least one end thereof. These cell retention members 16 can help hold respective ends of respective cells in desired alignment. The retention members 16 can be formed as an integral part of the carrier 10, such as a molded monolithic shape, that provides some retention capability without overly occluding the cell ends to facilitate electrical connections. The retention members 16 can alternate to reside on a single end at opposing ends of some adjacent channels 11.

FIGS. 1, 2, 3A and 3B illustrate that the length of a respective channel 11 is sufficient to hold at least a major portion of a length of a respective cell 20. In the embodiments shown in FIGS. 1, 2 and 3B, the length of the channel is substantially the same as that of a respective battery cell 20, typically so that the cell is flush or slightly recessed within a respective channel 11. FIG. 3A illustrates that two cooperating carrier bodies $10_1$, $10_2$ with aligned channels can hold opposing ends of respective cells 20. The two bodies can be longitudinally spaced apart or may contact at adjacent edges when assembled.

The outwardly projecting members 14 may be configured for alignment with other components at assembly into a battery pack 17 (see, e.g., FIGS. 7A, 8 and 9A) and/or to provide cushion, shock absorbance and/or impact resistance. The bumpers 15 can help the carrier 11 fit snugly inside a cavity of a battery pack housing while accommodating some manufacturing variance/tolerance. The outer surfaces of the carrier 10 may compress when placed into the housing upon contact with a battery pack housing inner wall and/or expand upon exposure to heat during operation.

FIGS. 4 and 5 illustrate that battery cell and carrier assembly 25 can include projecting members 14 that can project off only one surface (e.g., the top surface), with the other surface being devoid of such features with a thin repeating series of slightly arcuate projections (corresponding to the outerwalls of respective channels 11). However, both primary surfaces of the carrier (or neither) may include outwardly projecting members. Where used, these members 14 may be for cushioning, alignment, assembly and/or other reasons.

FIG. 9A illustrates that the projecting members 14 can be configured to extend through apertures in a circuit board 50 held inside a battery pack housing 17h. Some of the members, e.g., the taller ones 14t, may have free ends when assembled. Others, e.g., the wider members 14w, may be configured to contact an internal housing structure (e.g., rib) to provide shock absorbance and/or impact resistance. Still one or more others 14 may be positioned to react with a spring 100s in communication with a release button 100 for a battery latch 105.

The carriers 10 can have a Shore A hardness that provides sufficient rigidity to hold the cells in alignment and sufficient elasticity for compliant "padding" for cushion/impact resistance. In some embodiments, the carriers 10 can comprise an elastomeric material. The carrier 10 can be formed of a thermoplasticelastomer (TPE) material having a Shore A hardness between about 40-90, typically between about 60-85, and in some embodiments about 85. In particular embodiments, the carriers 10 can be a monolithic, molded (unitary) body of flame-retardant urethane or silicone rubber.

FIG. 3A illustrates that the carrier 10 can be configured as two separate portions $10_1$, $10_2$, that align with corresponding pairs of channels 11 holding a respective sub-portion of a given cell 20. The two portions $10_1$, $10_2$ can be spaced apart or abut each other upon assembly.

Figure 3B:
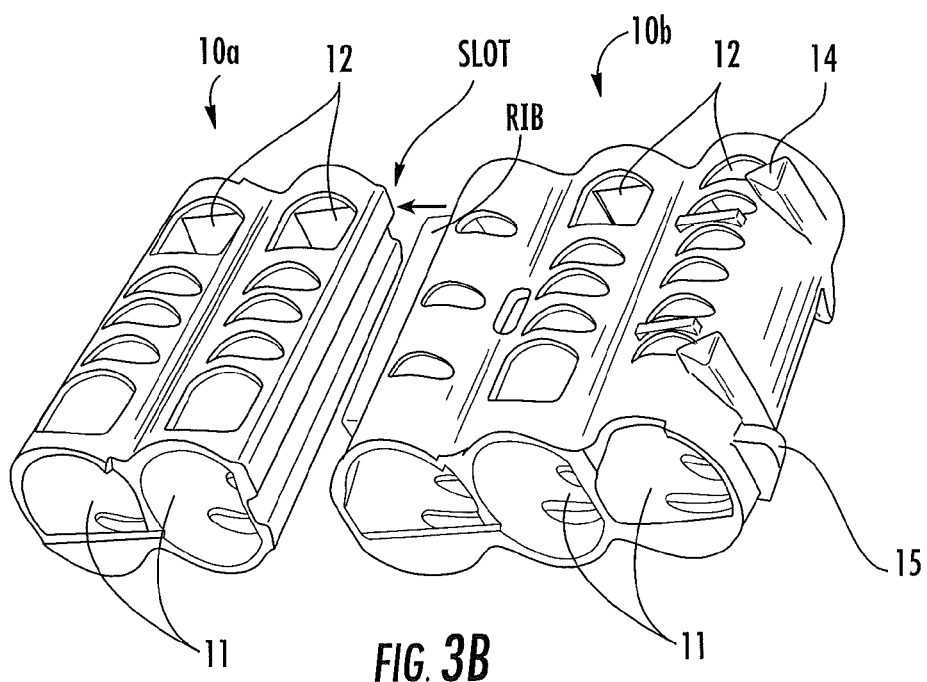
FIG. 3B is a side perspective view of an additional embodiment of a cell carrier according to embodiments of the present invention.

FIG. 3B illustrates that the sub-carriers 10a, 10b can be configured to engage to define the carrier 10. As shown, a first set of channels 11 in a first carrier sub-body 10a can attach to a second set of channels in a second carrier sub-body 10b. In this embodiment, one sub-body can comprise a slot and another tab or rib that interlocks with the slot to attach the sub-portions together. Other attachment configurations may be used.

It is also contemplated that carrier sub-portions can be stackable into a desired number of rows or columns for a certain configuration. The stacks may be configured to attach together using, for example, frictional engagement, bayonet attachments, cooperating rails and slots and other matable configurations. For example, two or more of the same carrier configurations e.g., two or more of the carrier in FIG. 2 can be stacked together or different carrier configurations can be stacked, e.g., one of FIG. 1 and one of FIG. 2.

Unitary body carriers or cooperating sub-carriers 10 can define a less bulky, compact carrier 10 over conventional cell holders that can reduce an overall battery size of multi-cell battery packs.

In some embodiments, each channel 11 can have the same wall 11w (FIGS. 1, 2, 3A) thickness as others. In other embodiments, different channels or portions of channels can have a different wall thickness. In some embodiments, the wall segments adjacent to neighboring channels (side to side or top to bottom) can, in particular embodiments, be between about 0.1 mm to about 5 mm thick, typically about 1.25 mm nominally. The wall segments that separate adjacent cells can have a closed surface or may be partially open (e.g., slotted).

In particular embodiments, each channel 11 can have a substantially constant wall thickness such as between about 0.1 mm to about 5 mm, typically between about 1-2 mm, such as about 1.25 mm, nominal (substantially constant over its length and sides with some manufacturing tolerance).

FIGS. 1, 2, 3A and 3B illustrate some exemplary form factors for the carriers 10. However, it is contemplated that other numbers of cells and arrangement of cells, alternate cell carrier wall thicknesses, venting configurations, and the like, can be used as well as other features to act as alignment keys for facilitating proper assembly and fitting within a battery housing.

Figure 6:
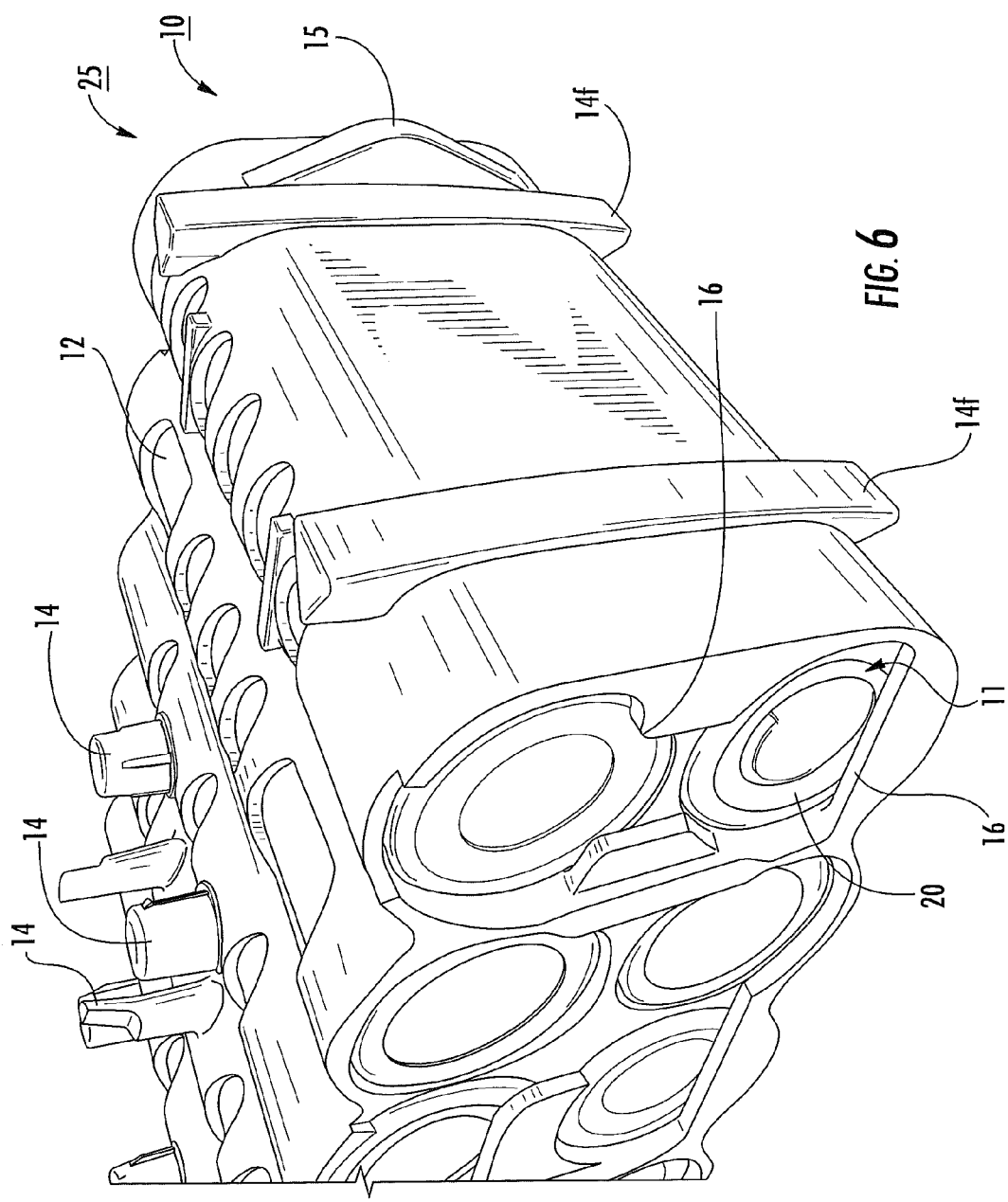
FIG. 6 is an enlarged side view of the cell carrier shown in FIG. 4.

FIGS. 4-6 illustrate that the battery cell assembly 25 can be oriented so that battery cells 20 are oriented to reside with their axially extending centerlines being horizontal. However, the cells 20 and carrier 10 may be oriented so that their axially extending centerlines extend vertically. Examples of battery types include NiCad, Lead Acid, NiMH, NiZn, Lithium Ion, Zinc-Carbon, Zinc-chloride, Alkaline, Oxy nickel hydroxide, Lithium, Mercury oxide, zinc-air, silver-oxide. The battery cells 20 and carrier channels 11 may be of any length, and are typically about 65 mm long. Voltages can vary widely and is dependent on type of battery chemistry used and number of batteries connected in series. While 5 and 10 cell configurations are conventional, other numbers of cells and other cell materials may be used.

Figure 10:
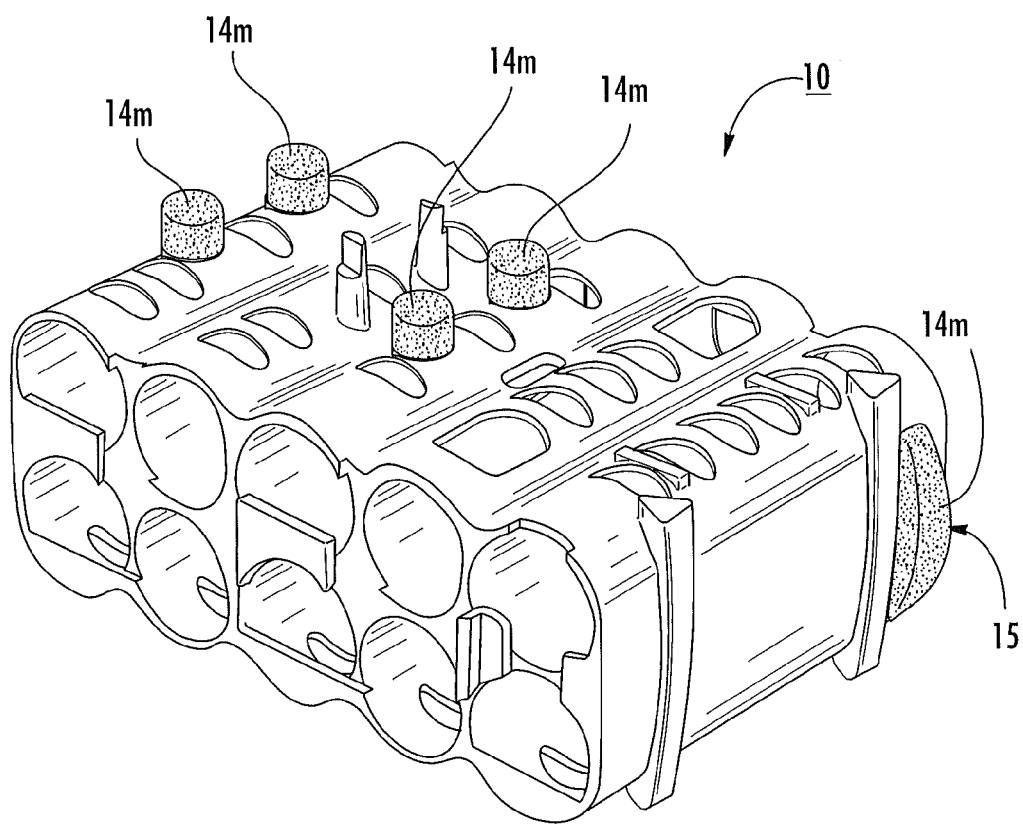
FIG. 10 is a side perspective view of an exemplary cell carrier with optional overmold members according to embodiments of the present invention.

FIG. 10 illustrates that in some embodiments, the carrier 10 can have a primary body 10p formed of a first elastomeric material with a first hardness, e.g., Shore A hardness of 80-90, and the primary body can include overmolded portions 14m of a second elastomeric material of a second, lesser hardness, e.g., Shore A 40-65, that provides increased cushioning. The bumpers 15 may be particularly suitable as overmold members 14m.

The carriers 10 can have a flexural modulus that changes as the material is strained as is known to those of skill in the art. Table 1 below illustrates an example of a material with Shore A hardness of about 85 and exemplary material characteristics including flexural modulus values at different percent strain. This data represents a PTS-Thermoflex 85/FR-VO*800/TPE VO/UL94 from Plastic Technology Service (PTS) GmbH and Ltd. However, it is contemplated that other materials can be used with different Shore A values and different flexural modulus values.

TABLE 1

SHORE A 85 AND EXAMPLES OF FLEXURAL MODULUS VALUES

| PROPERTIES | UNIT | STANDARD | VALUES |
|---|---|---|---|
| Hardness | Shore A | ISO 868 | 85 |
|  | Shore D | ISO 868 |  |
| Density | g/cm³ | ISO 1183 | 1.26 |
| Tensile Strength (md/pmd) | MPa | ISO 527-1/-2 | 8/7 |
| Modulus 10% (md/pmd) | MPa | ISO 527-1/-2 | 2.4/2.0 |
| Modulus 50% (md/pmd) | MPa | ISO 527-1/-2 | 3.6/2.9 |
| Modulus 100% (md/pmd) | MPa | ISO 527-1/-2 | 4.1/3.2 |
| Modulus 300% (md/pmd) | MPa | ISO 527-1/-2 | 5.4/4.3 |
| Elongation at Break (md/pmd) | % | ISO 527-1/-2 | 570/620 |
| Tear Strength (md/pmd) | kN/m | ISO 34-1 B | 33/32 |
| Rebound Elasticity | % | DIN 53 512 |  |
| Mould-shrinkage (md/pmd) (test-plate 150* 100*2 mm) | % | PTS | 1.3/0.5 |
| Compression Set −70 h 23° C. −24 h 70° C. −24 h 100° C. | % | ISO 815 Specimen diameter 13 mm/29 mm | 6 mm/15% 38 60 — |
| After-shrinkage/hot air (md/pmd) (test-plate 150* 100*2 mm) −24 h 70° C. −24 h 100° C. −24 h 120° C. | % | PTS |  |

The carrier 10 can be formed by a single shot or multi-shot molding process. Molding processes are well known to those of skill in the art. The carrier 10 can be a monolithic member of one material or a laminate member of different elastomeric materials having different durometers. For carriers 10 with multiple layers of materials or with an overmold 14m, a multi-shot molding process can be used as is well known to those of skill in the art. See, e.g., Venkataswamy et al., *Overmolding of Thermoplastic Elastomers: Engineered solutions for consumer product differentiation*, pp. 1-18, Jun. 19, 2007, GLS Corporation, McHenry, Ill.; and *Overmolding Guide*; copyright 2004, GLS Corporation, McHenry, Ill. The overmold material for cushioning can be a thermoplastic elastomer material, examples of which may include, but are not limited to, DuPont™ ETPV (engineering thermoplastic vulcanates) 60A01HSL BK001, DuPont™ ETPV 90A01HS BK001, the Versaflex™ OM series from GLS Corporation, Mt. Henry, Ill., such as the Versaflex™ OM 6240-1 and OM 6258-9 TPE alloys.

Figure 7:
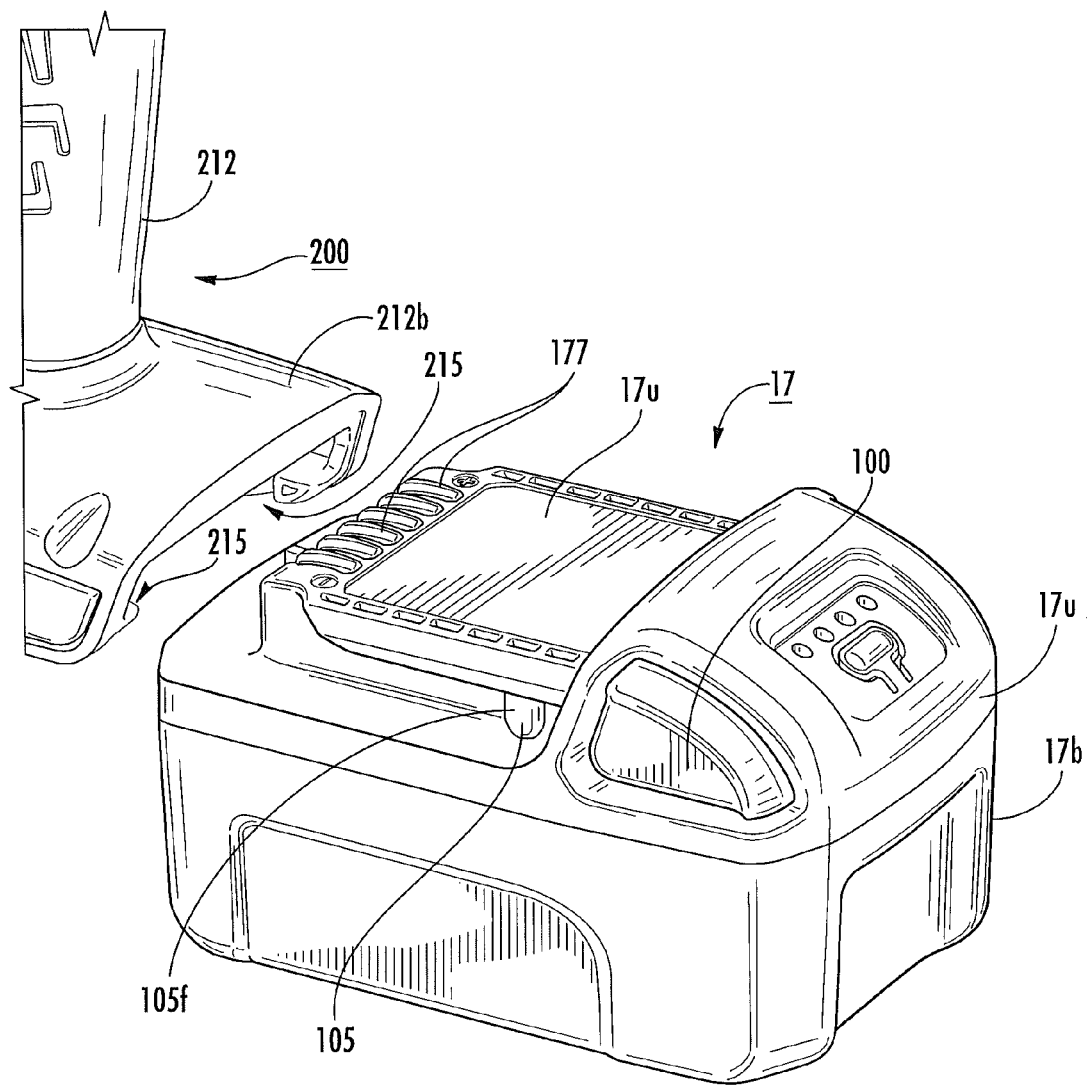
FIG. 7 is a side perspective view of a battery pack releasably attachable to an electrical device housing according to embodiments of the present invention.

As shown in FIG. 7, the battery pack 17 can have an upper body 17u and a lower body 17b that define a cavity 170 (FIG. 9) therebetween. The battery pack upper and lower body, 17u, 17b, respectively, can releasably or integrally attach to each other to encase battery cells 20 (FIG. 4). The battery pack 17 can have an exposed upper surface 17s with electrical contact pads 177.

Figure 8B:
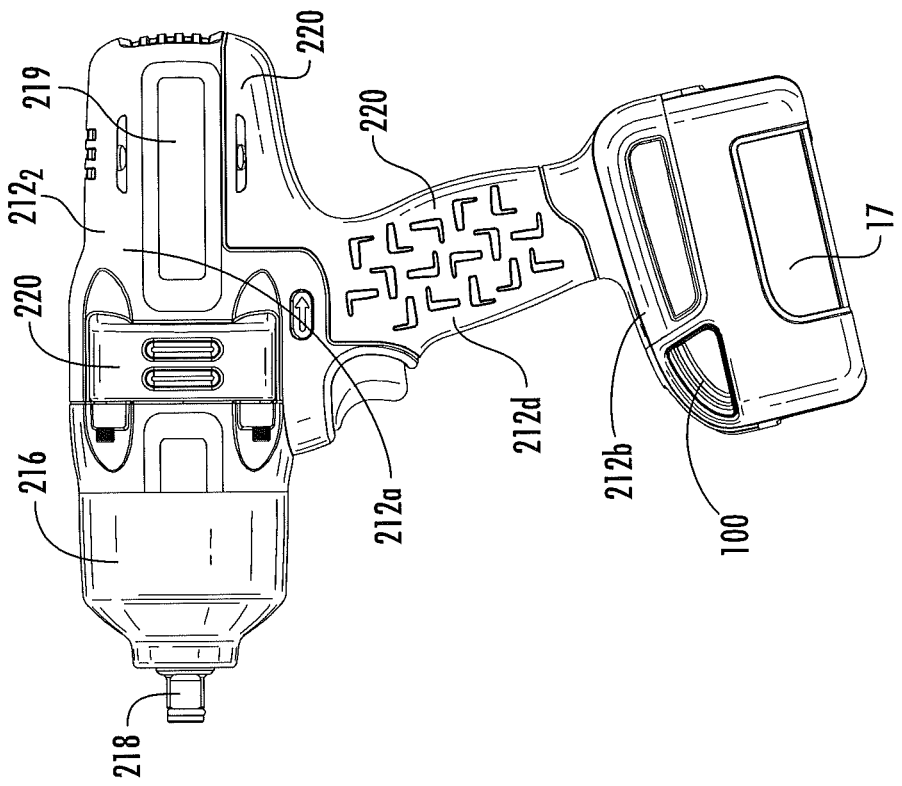
FIG. 8B is a side view of the tool shown in FIG. 8A.
Figure 8A:
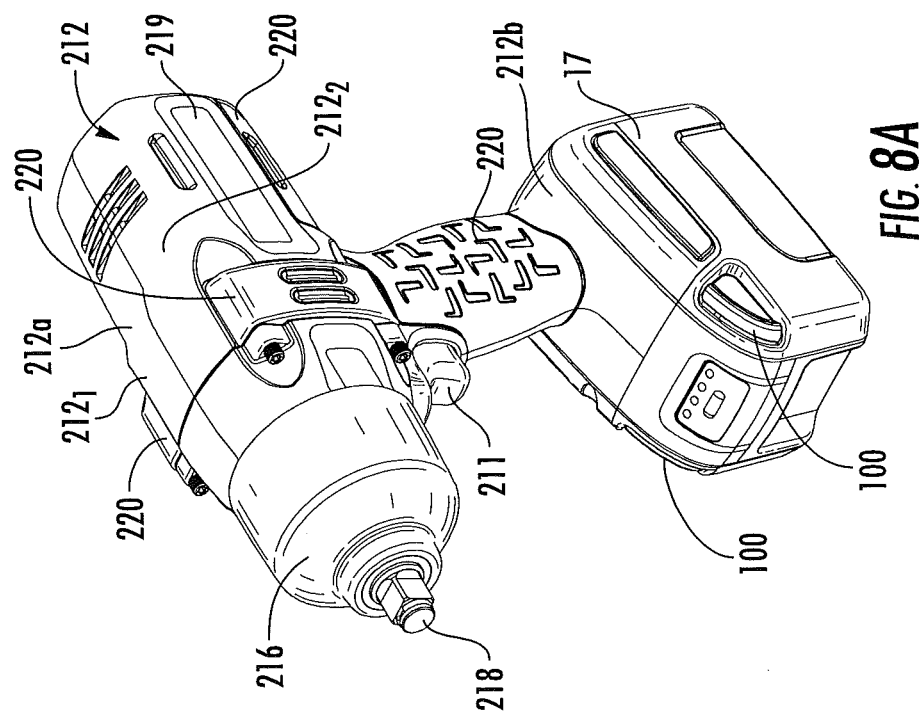
FIG. 8A is a side perspective view of an exemplary cordless power tool according to embodiments of the present invention.

FIGS. 8A and 8B illustrate an example of a type of power tool 10 that includes a housing 212, a gearcase 216 and a tool output shaft 218. The housing 212 encases a motor and partially surrounds the gearcase 216. The gearcase 216 can be metallic and encloses a drive train. In this embodiment, the lower portion of the housing can releasably engage the battery pack 17. The housing 212 can include an external control such as a trigger 211 and a UI (user interface) 219 with a display. However, the tool 210 and/or housing 212 can have other configurations and may enclose the gearcase and/or have other handle configurations. In some embodiments, and as shown, the housing can be a "pistol" type housing that can include first and second substantially symmetrical clam shell bodies 212₁, 212₂ with an upper substantially axially extending head portion 212a that merges into a downwardly extending hand grip portion 212d.

As is well known to those of skill in the art, the housing, which may optionally be formed using shell bodies can comprise a substantially rigid substrate 212r that has sufficient structural strength (and hardness) to be able to support the tool components, with or without reinforcement members. The substantially rigid substrate for each shell body 212₁, 212₂ can comprise a single or multi-shot, injection-molded shell body. An example of a suitable moldable composite material is glass-filled nylon. However, other non-metallic materials, typically composite materials that comprise polymeric materials, can be used, particularly those with a hardness or durometer of at least about 90 Shore A. Softer material overmold portions 220 can be used on exterior surfaces of the housing.

FIG. 7 illustrates that the battery pack 17 can include at least one latch 105 that releasably engages the power tool housing 12. The battery pack 17 can also includes at least one manually (user) depressible release member 100 that translates the at least one latch 105 to allow the detachment of the battery pack 17 from the tool housing 12. The latch 105 can include a downwardly extending finger 105f that slidably engages a slot 216. The slot 216 can be an open slot. To actuate the release member 100, a user pushes down both release members 100, typically substantially concurrently, which causes the respective latch 105 to move up and/or inward to a prescribed position to allow the battery pack to be disengaged from the power tool (the movement of the latch can be to move it inward toward the center open space away from the respective ledge 216). The latch and release configurations are not limited to the embodiment shown and can be any suitable configuration. For example, in some embodiments, the battery pack 17 can employ a single release member. In addition, the one or more release members 100 can be configured to translate using an inward application (push) force, rather than a downward force, or even outward or upward force. In yet other embodiments, a user can manually apply a dual application force, e.g., a manual push inward and downward. In addition, although particularly useful for power tools, the battery packs can be configured for use with other electric devices.

Figure 12:
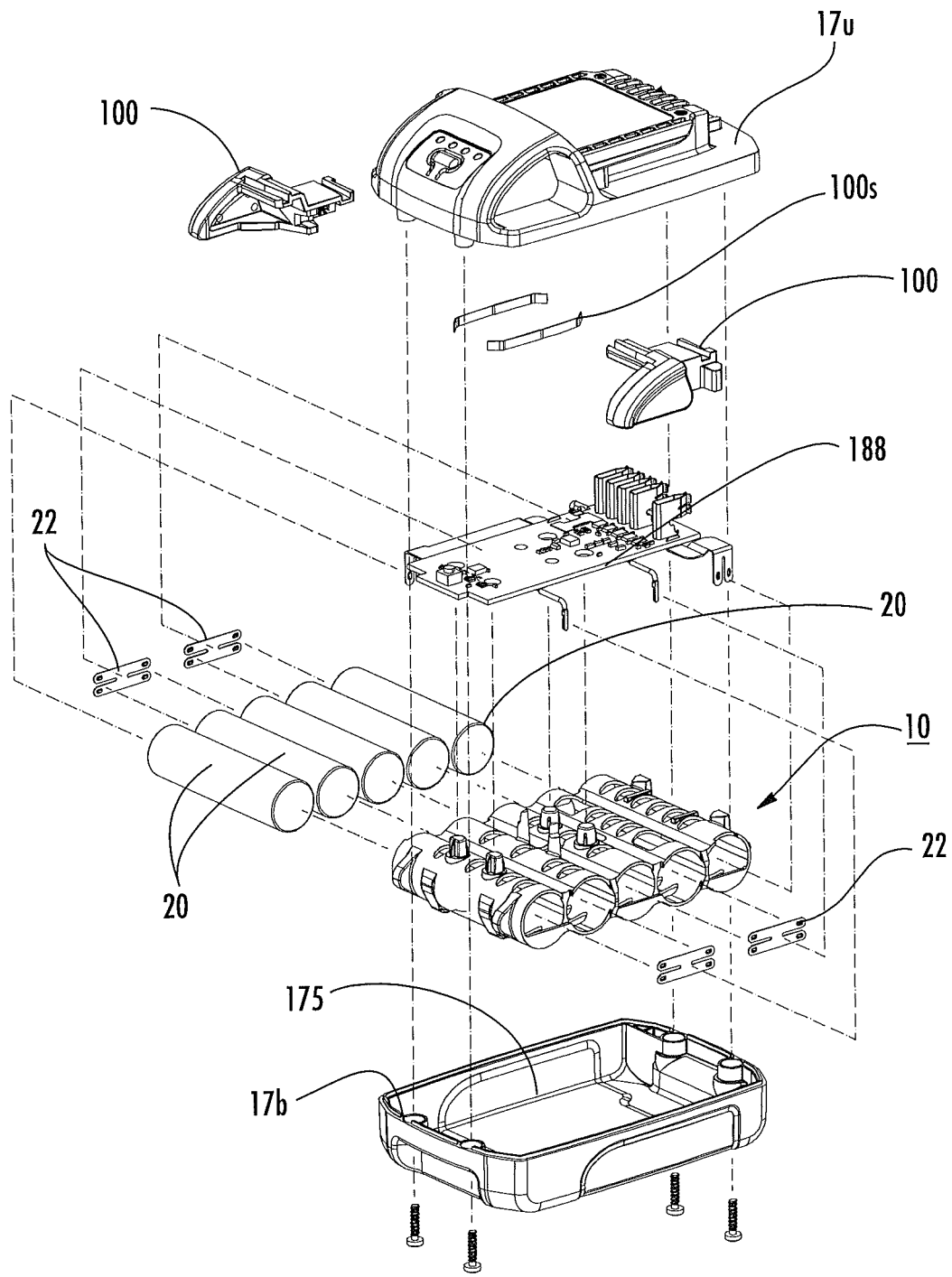
FIGS. 12 and 13 are exploded views of exemplary battery packs corresponding to those shown in FIGS. 9B and 9C according to some embodiments of the present invention.
Figure 13:
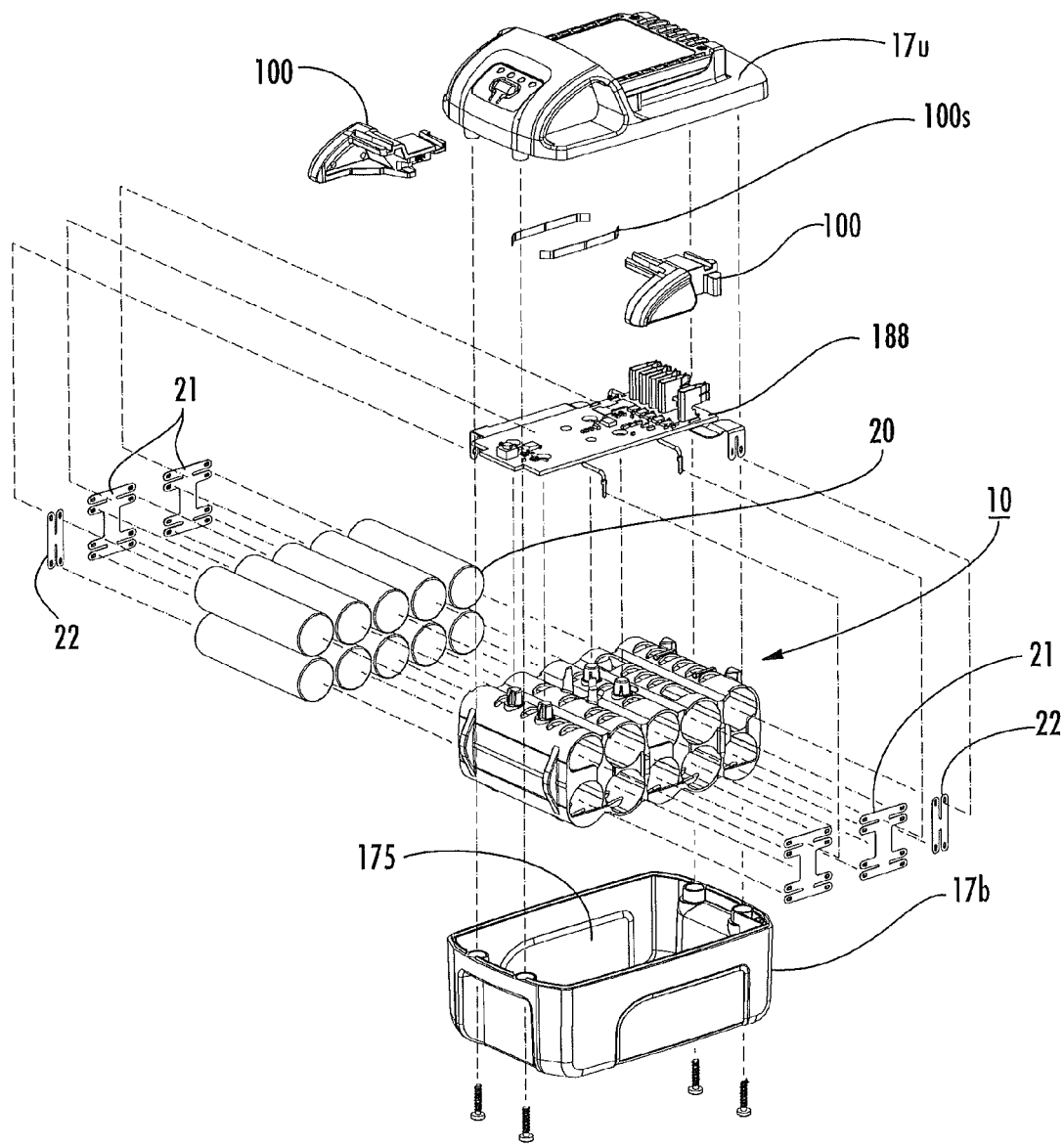

Turning to FIGS. 9A-9C and FIGS. 12 and 13, the battery pack housing 17h can have a cavity 175 that snugly receives the carrier 10 so that the carrier 10 directly resides against the downwardly extending walls of the housing. The projecting members 14 can extend above the circuit board 188 via apertures 188a. The circuit board 188 can be a control circuit that controls certain operations of a power tool or other device. FIGS. 12 and 13 also illustrate that cell straps 21, 22 (the embodiment shown in FIG. 12 only uses cell straps 22) can be used for the desired electrical connections of the cells 20 as is known to those of skill in the art.

Figure 11:
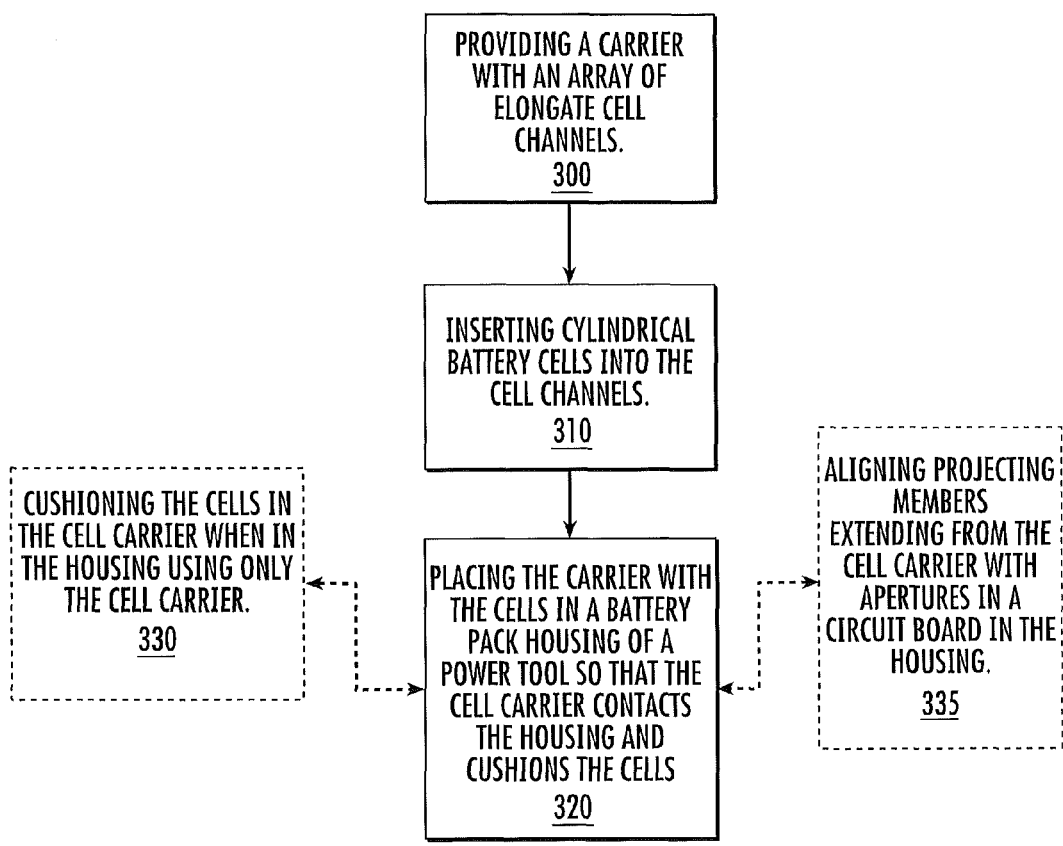
FIG. 11 is a flow chart of exemplary assembly steps that can be used to assemble a power tool according to embodiments of the present invention.

FIG. 11 is a flow chart of exemplary operations that can be carried out according to embodiments of the invention. A carrier with an array of elongate cell channels is provided (block 300). Cylindrical battery cells are inserted into the cell channels (block 310). The carrier with the cells is placed in a battery pack housing of a power tool so that the cell carrier contacts the housing and cushions the cells (block 320).

The cells in the cell carrier, when in the housing, can be cushioned from impact forces using only the cell carrier (block 330). Alternatively, or additionally, projecting members extending from the cell carrier can be aligned with apertures in a circuit board in the housing (block 335).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A multi-cell carrier for battery cells, comprising: a semi-rigid elastomeric carrier having a plurality of closely spaced apart, substantially parallel and substantially cylindrical channels, wherein the carrier is a unitary monolithic molded elastomeric body, wherein each channel has an outer wall and a length, with neighboring channels sharing a sidewall therebetween, wherein at least some of the channels include at least one vent extending though the outer wall, and wherein the channels are sized and configured to hold at least a major portion of a length of a respective battery cell.

2. The carrier of claim 1, wherein the channels are arranged as an array of channels with at least two rows of channels.

3. The carrier of claim 1, wherein the elastomeric carrier has a carrier body with a Shore A hardness of between about 60-90.

4. The carrier of claim 1, wherein at least some of the channels have a plurality of vents in the respective outerwall spaced apart along their length.

5. The carrier of claim 1, further comprising at least one upwardly extending member that extends above a channel outer wall that provides for impact resistance and/or alignment when assembled to a housing of a battery pack.

6. The carrier of claim 1, wherein the carrier has a carrier body with an upper surface and a lower surface, and wherein the channel outer walls associated with the upper surface have a different vent configuration than the channel outer walls associated with the lower surface.

7. The carrier of claim 1, further comprising at least one bumper.

8. The carrier of claim 7, wherein the at least one bumper extends outwardly from an end of the carrier in a direction that is substantially orthogonal to an axially extending centerline of the channels.

9. The carrier of claim 1, wherein at least one of the channels includes a retention member at an end thereof.

10. The carrier of claim 1, further comprising downwardly extending feet that project a distance outside bounds of a lower primary surface of the carrier.

11. The carrier of claim 1, wherein the carrier has a body of a first substrate and includes at least one overmold portion comprising a softer material than the first substrate.

12. The carrier of claim 1, wherein the cell carrier channels includes two overlying rows of five channels each.

13. The carrier of claim 1, wherein the carrier comprises a first unitary monolithic molded elastomeric carrier body and a second unitary monolithic molded elastomeric carrier body, each comprising a plurality of cell channels that hold cells for a battery.

14. The carrier of claim 13, wherein the first and second carrier bodies have axially aligned, longitudinally spaced apart channel portions that cooperate to hold more than a major portion of the length of a respective battery cell.

15. The carrier of claim 13, wherein the first and second bodies are configured to attach to each other.

16. A battery pack for an electric device in combination with the cell carrier of claim 1, comprising:
   a plurality of substantially cylindrical battery cells, one each residing in a respective channel, wherein at least a major portion of a length of a respective battery cell is held by a respective channel; and
   a battery pack housing holding the carrier with the cells.

17. The battery pack of claim 16, wherein the battery pack housing is sized and configured to releasably engage a cordless power tool.

18. The battery pack of claim 16, further comprising a circuit board residing over the carrier with the cells, wherein upwardly projecting members from the carrier extend above the circuit board.

19. A cordless power tool comprising:
   a power tool housing; and
   a battery pack that releasably engages the power tool housing, the battery pack comprising:
   a semi-rigid elastomeric cell carrier having a unitary monolithic molded body with a plurality of closely spaced apart, substantially parallel and substantially cylindrical channels, wherein each channel has a length, with neighboring channels sharing a sidewall therebetween; and
   a plurality of substantially cylindrical battery cells, one each residing in a respective channel, wherein at least a major portion of a length of a respective battery cell is held by a respective channel.

* * * * *